July 16, 1929.  C. E. WARD  1,721,239
REDUCTION GEAR DRIVE FOR STERN WHEEL BOATS
Original Filed May 13, 1926  5 Sheets-Sheet 1

Inventor
Charles E. Ward
Attorney

July 16, 1929.  C. E. WARD  1,721,239

REDUCTION GEAR DRIVE FOR STERN WHEEL BOATS

Original Filed May 13, 1926  5 Sheets-Sheet 4

Fig. 8.

Inventor
Charles E. Ward,
By
Attorney

July 16, 1929.          C. E. WARD                1,721,239
            REDUCTION GEAR DRIVE FOR STERN WHEEL BOATS
            Original Filed May 13, 1926    5 Sheets-Sheet 5

Patented July 16, 1929.

1,721,239

UNITED STATES PATENT OFFICE.

CHARLES E. WARD, OF CHARLESTON, WEST VIRGINIA.

REDUCTION-GEAR DRIVE FOR STERN-WHEEL BOATS.

Application filed May 13, 1926, Serial No. 108,886. Renewed May 16, 1929.

This invention relates to reduction gear drive for stern wheel boats and has for its object to provide a construction which is more efficient in use than those heretofore proposed.

With this and other objects in view the invention consists in the novel details of construction and arrangements of parts more fully disclosed hereinafter and particularly pointed out in the claims.

Referring to the accompanying drawings forming a part of this specification in which like numerals designate like parts in all the views.

In order that the invention may be the better understood, it is said that in stern wheel boats of the class to which this invention is applied, the propelling power of the vessel was originally a single stern paddle wheel. Subsequent developments produced a double paddle wheel, or a paddle wheel was divided mid-way its ends with each half of the original paddle mounted on a common shaft. The driving gear arrangement for the single wheel construction proved unsatisfactory in that it comprised a duplicated shaft and gear connections made at the extreme sides of the vessel and therefore exposed to damage from collisions, etc. Likewise the gear drive for the divided wheel was not satisfactory because the wheel shaft had a gear mounted thereon between the halves of the wheel and which would get out of mesh with its driving pinion due to the axial movement of the wheel shaft, resulting in stripped teeth and necessitating gear replacement which could only be done by removing the wheels and their shaft.

Further developments then separated the wheel shaft into two independent shafts upon the inner ends of each of which was mounted a bevel gear driven by pinions from the main driving shaft connected with the engine. In this last mentioned development, the disposition of the pinions and their enmeshing driven gears was such that, although the gears would still become unenmeshed with resultant breaking of teeth if not more serious damage to the mechanism, yet the gear replacement was made easier since the wheel gear could be removed without dismantling the entire wheel and shaft. Therefore it is to the improvement of the prior constructions that this invention is directed.

In the drawings 1 represents the main deck of the vessel, 2 and 3 the paddle wheels mounted respectively on the shafts 4 and 5, said wheels adapted to operate in the space 5 between the splash board 6 located at the rear of the deck, and the tail beam 7 which connects the extremities of the two side frames of the vessel, not shown, but which support the outer ends of the wheel shafts 4 and 5, all in accordance with the usual construction.

Figure 1:
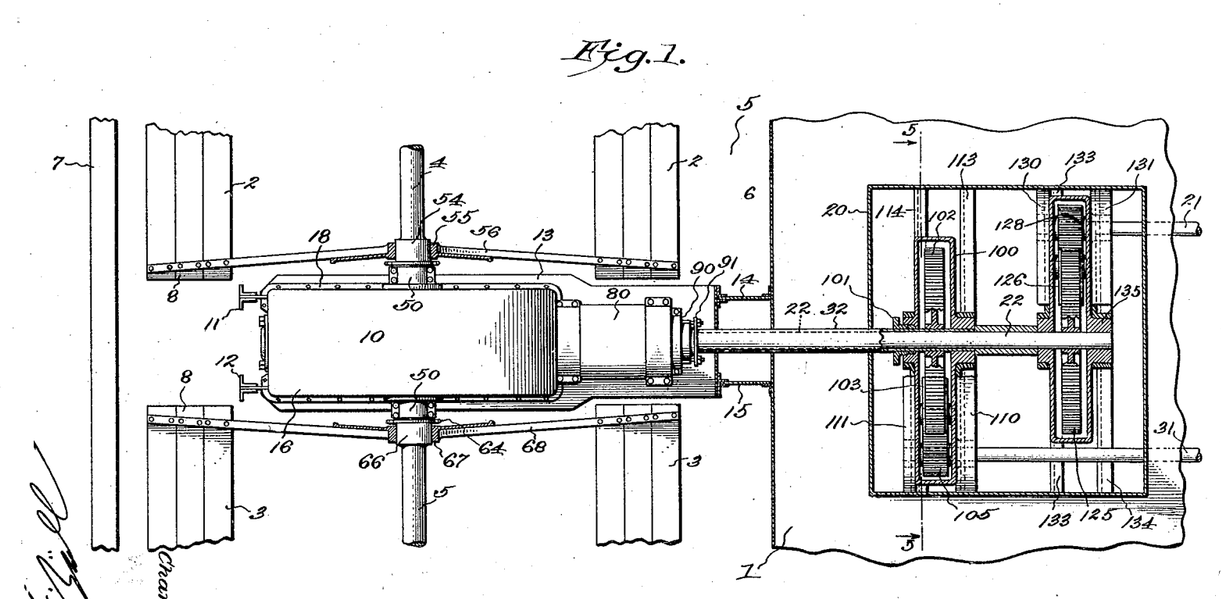
Fig. 1 is a top plan view partly in section showing the general arrangement of the reduction gear drive.

The paddle wheels 2 and 3 are rigidly secured to their driving shafts and are so constructed as to provide a space generally indicated by the numeral 8 between their innermost sides, and within which is disposed the gear housing generally indicated by the numeral 10 supported in any convenient manner by the steel framing of the vessel as by the brace members 11 and 12 at the rear thereof, the substantially horizontal plate 13, and the structural connections with the body of the vessel as indicated at 14 and 15, see Fig. 1. The housing 10 is made in two parts as is the usual practice, the upper half 16 being readily removable from the lower half 17 to permit easy access to the gears within said housing, the two halves having a suitable water tight gasket therebetween and being secured together by bolts disposed in the flange 18, all as will be readily understood from Figs. 1 and 2. It is an important feature of this invention that the structural supporting members 11, 12, 13, 14 and 15 are rigidly secured to, and form an integral part of the steel frame work of the vessel, so that the innermost ends of the driving shafts 4 and 5 are rigidly supported, as well as their outer ends, by the steel framework of the vessel. 20 indicates a protective housing on the deck 1 of the vessel for the planetary gear reduction mechanism forming a part of this invention. In other words, the said planetary gears, to be described later, convey the power from the shaft 21 disposed below the deck 1 of one engine, to the shaft 22 disposed above the said deck and extending rearwardly into the gear box 10 and having near its end the bevel pinion 23 rigid therewith and enmeshing with the bevelled driving gear 24 rigidly secured to the innermost end of the shaft 4 carrying the paddle wheel 2. Further, it will be seen that within said housing 20 is disposed a second set of planetary gearing which is adapted to convey power from a shaft 31, likewise disposed below the deck 1 of the vessel, of the other engine of the vessel, to the tubular shaft 32 disposed above said deck and encompassing the shaft 22, said tubular shaft 32 extending rearwardly to just within the gear box 10 where it terminates in the flange 33 which is adapted to be secured as by the bolts 34 to the flange 35 of a tubular sleeve 36 the rearward end of which carries the bevel pinion 37 enmeshing with the bevelled driving gear 38 rigidly secured to the iner end of the driving shaft 5 having rigidly secured thereto the other paddle wheel 3, see Fig. 2.

Figures 2, 3, 4:
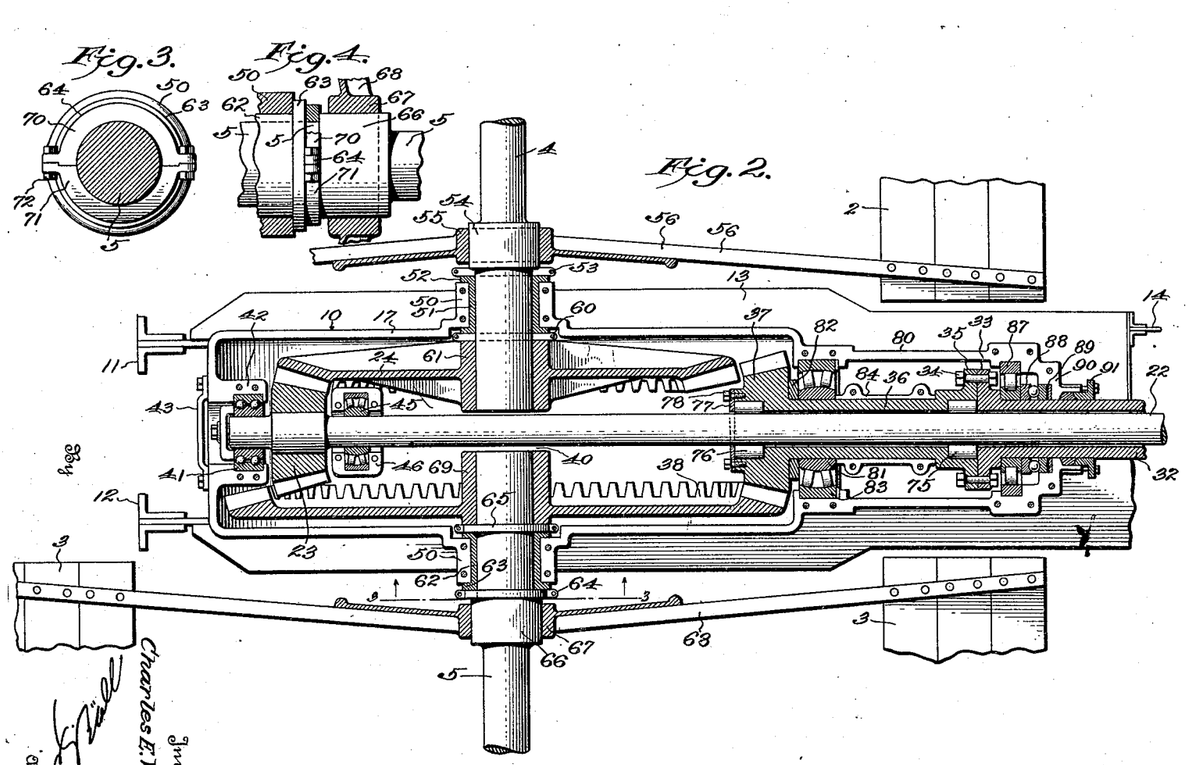
Fig. 2 is a view similar to Fig. 1 with the cover of the gear box removed showing in sectional detail the driving gears.
Fig. 3 is a transverse sectional view taken on the line 3—3 of Fig. 2 and looking in the direction of the arrows.
Fig. 4 is a detail side elevational view partly in section of the thrust washer shown in Fig. 3.

With particular reference to Fig. 2 it will be observed that the wheel shafts 4 and 5 are coaxially disposed and that their inner ends are separated, forming the space 40 therebetween through which the solid shaft 22 passes, the extreme end of said shaft 22 being supported in a suitable bearing such as that indicated at 41 having a double ball race carried by an inwardly formed boss 42 formed in the housing 10. The gear box 10 is provided with a cover plate 43, coaxially disposed with reference to the shaft 22, to permit the withdrawal of the said shaft through said gear box when occasion demands, and a gasket is provided between said cover plate and said box to keep out water splashed by the wheels. 45 represents a suitable self aligning roller bearing carried by the brackets 46 secured within the housing 10, said roller bearing adapted to further support the shaft 22 on the forward side of the bevel pinion 23.

The housing 10 carries the outturned hub portion 50 having the babbitted bearing 51 therein for the reception of the shaft 4, and it is to be noted that the babbitted bearing 51 is provided with the outwardly turned side flanges 52 to provide a surface against which one side of a thrust washer 53 may take, the other side of said thrust washer adapted to take against the side of the enlarged portion 54 of the shaft 4 and to which is secured the hub 55 carrying the spokes 56 of the paddle wheel 2. Similarly there is provided a thrust washer 60 disposed between the other flange of the babbitted bearing 51 and the side surface of the hub 61 of the bevelled driving gear 24 rigidly secured to the extreme end of the wheel axle 4. Similarly there is provided on the opposite side of the housing 10 a duplication 62 of the babbitted bearing 51, whose end flanges 63 are adapted to contact with the thrust washers 64 and 65 exactly similar in all respects to the thrust washers 53 and 60, the thrust washer 64 being disposed between the babbitted bearing 62 and the side of the enlarged portion 66 of the wheel shaft 5 and adapted to carry the hub 67 to which is secured the spoke 68 of the other paddle wheel 3. Lastly, the thrust washer 65 is disposed between the other end of the babbitted bearing 62 and the side of the hub 69 of the bevel driving gear 38 rigidly secured to the innermost end of said wheel shaft 5.

These thrust washers 53, 60, 64 and 65 are all easily accessible when the upper portion 16 of the gear box 10 is removed, and with special reference to Figs. 2, 3 and 4 it is to be observed that each thrust washer is made in two halves, such as 70 and 71, secured together as by the bolts 72 about their respective wheel shafts. The purpose of these thrust washers is to permit the withdrawal of the bevel pinions 23 and 37, as well as the bevelled driving gears 24 and 38 from within the gear casing 10 when occasion demands. In other words, should it be desired to remove the pinion gear 23, the bevel gear 38 will have to be moved axially of the shaft 5 in order to release the pinion 33 which it will be observed in Fig. 2 lies within the bevel gear 38. In such a case, the cover 16 of the gear case 10 is first removed, then the thrust washers 64 and 65 are removed, the bevel gear 38 loosened from and slid axially of its shaft 5 in a direction away from the bevel pinion 23. The cover plate 43 and the bearing 41 are then removed and the pinion 23 loosened from its shaft 22, whereupon said shaft may be withdrawn and the pinion 23 easily removed due to the fact that the gear 38 will have been moved on the shaft 5 a distance equal to the combined thickness of the two thrust washers 64 and 65 which is made a little more than equal to the overlapping dimensions with respect to the pinion gear 23 and the larger gear 38. If it is found necessary, either or both of the other thrust washers 53 and 60 may be removed and the gear 24 slid axially of its shaft 4 to further aid in the removal of the pinion 23 or the pinion 37.

From the above it will be seen therefore that the thrust washers 53 and 60, the flanged bearing 51, and the hub 50 of the gear casing 10 all combine to provide a means adapted to prevent the axial movement of the wheel shaft 4. That is to say, it will be remembered that the gear casing 10 is rigidly secured to, and forms a part of, the steel framework of the vessel. Therefore, the wheel shaft 4 is prevented from moving toward the other wheel shaft, due to the fact that the side of the enlarged portion 54 of said shaft 4 takes against the thrust washer 53 which in turn takes against the flange 52 of the bearing 51 which in turn takes against the end of the hub 50 of the gear casing 10. Similarly the wheel shaft 4 is prevented from moving in a direction away from the other wheel shaft and the hub 61 of said gear takes against the thrust washer because the gear 24 is rigidly secured to the end of said shaft 60 which in turn takes against the flange of the gearing 51 which in turn takes against the inner end of the hub 50 of the said gear casing 10. In exactly the same manner, the thrust washers 64 and 65 serve as a means for preventing the axial movement of the shaft 5 of the other paddle wheel 3.

Referring particularly to Fig. 2 it will be observed that the pinion 37 is rigidly secured to or made a part of the sleeve 36 having the flange 35 forming one half of the coupling with the flange 33 of the tubular shaft 32, thus completing the transmission of power from said last named shaft to said pinion. Within the flanged end of the sleeve 36 there is provided a roller bearing 75 adapted to space said sleeve from the solid shaft 22 passing through said sleeve, and said roller bearing is retained in place by the outer radial surface of the flange 33 of the tubular shaft 32, all as will be clear from said figure. The pinion end of said sleeve 36 is suitably hollowed or bored to provide the space for the roller bearings 76 likewise to space said sleeve from the solid shaft 22 passing therethrough, and said roller bearing 76 is retained in place by the cover plate 77 secured to the pinion 37 as by the bolts 78.

The gear casing 10 is provided with a reduced portion generally indicated at 80 to house the end of the tubular shaft 32, the pinion sleeve 36 secured thereto and the bearings provided for each. The parts are well illustrated in Fig. 2 wherein it will be seen that a suitable self aligning roller bearing 81 is provided disposed about the sleeve 36 and within the casing 80. Also it will be seen that this self aligning bearing is spaced from the pinion 37 as by the thrust washer 82 and that the outer member of the bearing 81 is retained from sidewise movement in a suitable pocket 83 formed in the housing 80. The inner member of this bearing 81 is held in spaced relation from the flanged end of the sleeve 36 by any suitable means such as the retainer sleeve 84 made in halves, with the result that the pinion sleeve 36 is secured within the gear casing 80 by the thrust washer 82, the bearing 81, the sleeve 84, and the flange 33 of the tubular shaft 32. In other words, movement of the tubular pinion shaft 36 to the left as seen in Fig. 2 is prevented not only by the bearing 81, but by the enmeshed teeth of the pinion 37 and its companion gear 38, and movement of said sleeve to the right in said figure is prevented by the flange 33 of the tubular shaft 32.

Movement of the flange 33 of the shaft 32 to the right as seen in Fig. 2 is prevented by the shoulder of said flange taking against the roller bearing 87 which in turn takes against the thrust bearing 88 seated in the pocket 89 of the end 90 of the housing 80. A suitable stuffing box which may be of the type shown at 91, prevents water splashed by the wheels from entering the gear casing 10.

Figure 5:
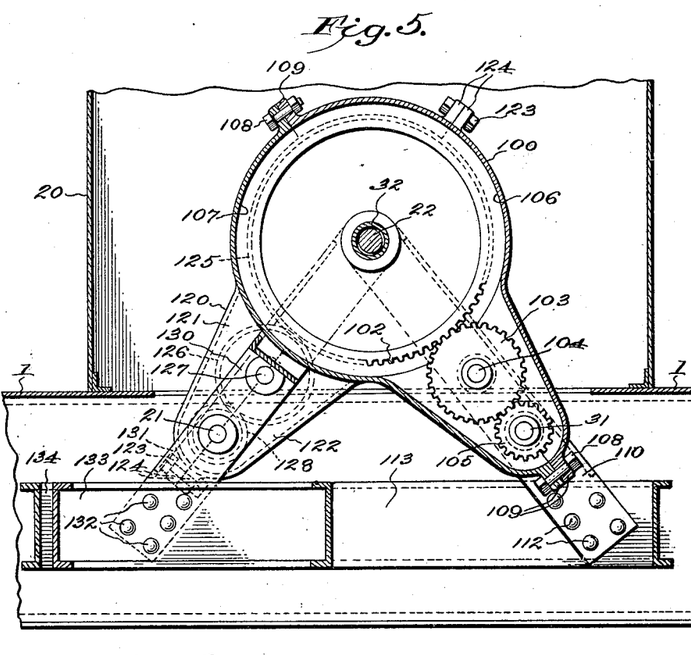
Fig. 5 is a transverse sectional view taken on the line 5—5 of Fig. 1 and looking in the direction of the arrows.

With particular reference to Figs. 1 and 5 it will be seen that the outer tubular shaft 32 extends out of the gear casing 80 and into the housing 20 for the reduction gears, and further it will be seen that at the extreme end of said tubular shaft there is an angularly disposed casing generally indicated by the numeral 100 provided on its aft side with a stuffing box 101. Within the gear casing 100 is the large planetary gear 102 rigidly secured to the tubular shaft 32, which is adapted to enmesh with its intermediate gear 103 mounted on the stub shaft 104 the ends of which are journalled in the sides of the gear casing 100, and the intermediate gear 103 is adapted to enmesh with the gear 105 rigidly secured to the aft end of the shaft 31 of one of the engines not shown. The gear casing 100 is preferably made in two halves such as 106 and 107 suitably secured together as by the bolts 108 passing through the flanges 109 of said halves. Angle bars 110 and 111, the lower ends of which are riveted as at 112 to the channel irons 113 and 114 respectively forming part of the framework of the vessel, extend upwardly, their upper ends supporting the end of the tubular shaft 32 in suitable journals, not shown.

The solid shaft 22 extends beyond the end of the tubular shaft 32 as clearly shown in Fig. 1 and has disposed about its extreme end, a gear casing 120 similar in all respects to the gear casing 100 except that it is disposed at an opposite angle to the aforementioned gear casing. The gear case 120 is made in two halves 121 and 122 secured together as by the bolts 123 passing through the flanges 124 of each half. This gear casing 120 encloses the large planetary gear 125 rigidly secured to the solid shaft 22 and enmeshing with the intermediate gear 126 mounted on a stub shaft 127 the ends of which are suitably journalled in the sides of the gear casing 120. Intermediate gear 126 also enmeshes with the planetary pinion 128 rigidly secured to the end of the driving shaft 21 of the other engine of the vessel. With particular reference to Fig. 5 it will be seen that the gear housings 100 and 120 are angularly disposed in order that the engine shafts 21 and 31 may be separated to allow working space therebetween. Angle bars 130 and 131 have their lower ends secured as by the rivets 132 to channels 133 and 134 respectively which likewise form framework of the vessel. The upper ends of the angle bars 130 and 131 support the end of the shaft 22 in suitable journals such as indicated at 135. By the above construction it will thus be seen that the shafts 22 and 32 are supported by what may be termed an "A-frame" type of construction, the angle bars 110, 111 and 130, 131 constituting the legs of the frame, and the channel members forming part of the framework of the vessel constituting the base. The deck 1 is suitably cut away to permit the gear casings 100 and 120 to pass therethrough, and the housing 20 is provided for protection. Instead of the trains of gearing shown in Fig. 5, suitable sprockets and chains therefor may be provided whereby the proper reduction in speed may be obtained from the engine shafts 21 and 31 to the bevelled pinions 23 and 37 adapted to drive the paddle wheels 2 and 3, or in fact any other suitable and well known gear reduction may be used.

Figure 8:
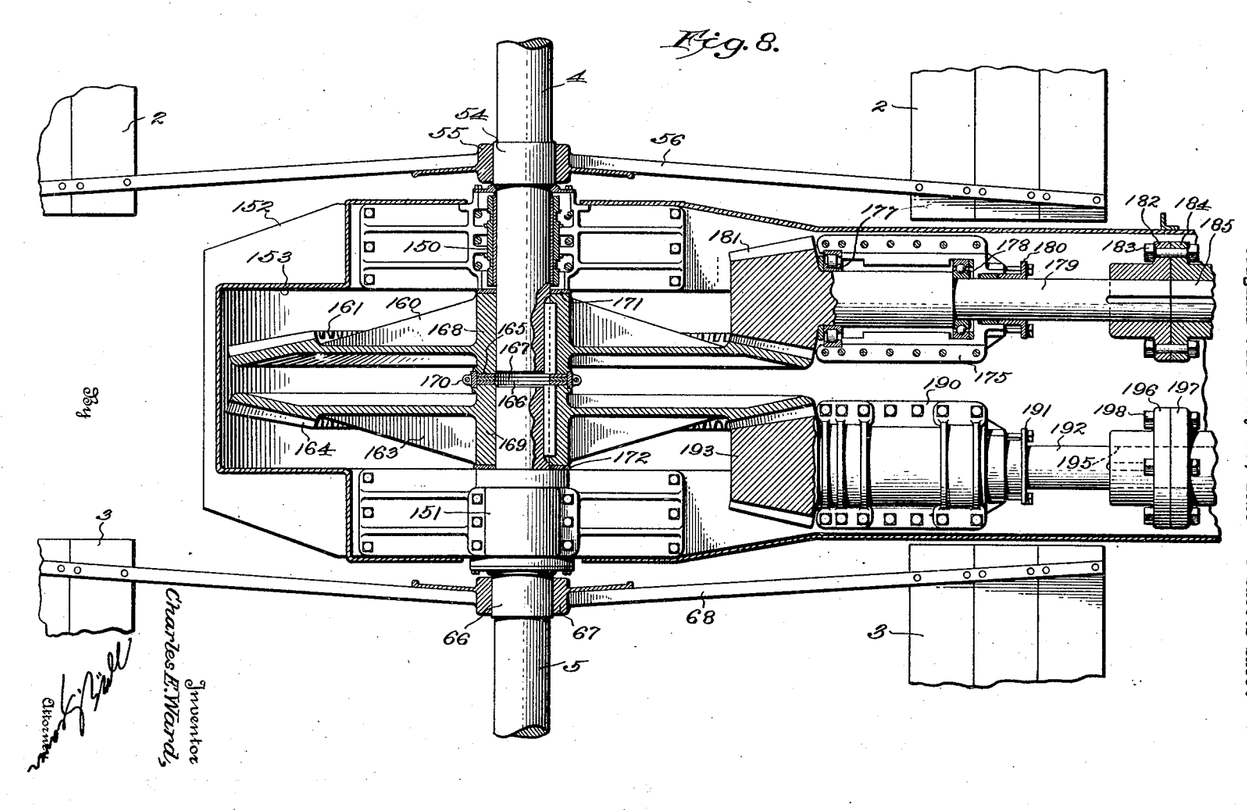
Fig. 8 is a view, partly in section and similar to Fig. 2, illustrating a modified form of the invention.

Referring to the modified form of the invention shown in Fig. 8, there is provided the paddle wheel 2 mounted on the shaft 4, and the paddle wheel 3 mounted on its shaft 5 the same as disclosed in Figs. 1 and 2. Further, it will be observed that the shafts 4 and 5 are independent of each other and the inner ends thereof are supported in the bearings 150 and 151 respectively, said bearings being in turn supported by the structural plate 152 rigidly secured to the steel framework of the vessel and adapted to further support the gear box 153 made in upper and lower halves similar to the gear box 10. However, the main bevelled driving gears are somewhat differently disposed than the driving gears disclosed in Fig. 2. That is to say, on the inner end of the wheel shaft 4 there is rigidly mounted the bevelled gear 160 with its back substantially in the plane of the end of the wheel shaft, or in other words, with its teeth 161 facing the paddle wheel 2 which it is adapted to drive. On the inner end of the wheel shaft 5 there is rigidly secured the bevelled driving gear 163 having its back in substantially the same plane with the end of its shaft, or in other words, with its teeth 164 facing the paddle wheel 3 which it drives. In other words, the two bevelled gears 160 and 163 are disposed in back-to-back relation, and in the space between the hubs of the said bevelled gears there is disposed a plurality of ring-like thrust washers 165, 166 and 167. The washer 165 is positioned against the end of the hub 168 of the gear 160, and the washer 166 is positioned against the end of the hub 169 of the gear 163, said washers 165 and 166 being of the same material. Between these last two mentioned washers is disposed the third washer 167 of a different material adapted to better wear in contact with the material of the washers 165 and 166 all as is well understood in the art. The three rings 165, 166 and 167 are retained in position between the gears 160 and 163 by any suitable means such as the split collar 170. Likewise there are provided suitable washers 171 and 172 between the gears 160 and 163 respectively and the bearings 150 and 151 all as will be clear from Fig. 8.

The plate 152 supports on one side thereof a journal block 175 containing suitable bearings such as the roller bearing 177 and the ball bearing 178 adapted to receive for free rotation therein the drive shaft 179 working through a stuffing box 180 in the end of the journal box. The aft end of said shaft 179 has integrally formed therewith, or rigidly secured thereto, the bevel pinion 181 adapted to enmesh with the bevel gear 160.

The shaft 179 extends but a slight distance out of the journal box 175 and has rigidly secured at its free end one member 182 of a flanged coupling adapted to be secured as by the bolts 183 to the other member 184 of said flanged coupling which is in turn rigidly secured to the end of the shaft 185 adapted to be connected in any suitable manner to one of the engines of the vessel. In other words, the shaft 185 may be the engine shaft itself, or it may correspond, for example, with the shaft 22 in Fig. 1 and provided with any suitable speed reducing mechanism such as the train of gears shown in said Fig. 1 which in turn is connected to the shaft of one of the twin engines.

The said plate 152 supports on its other side a journal box 190 similar in all respects to the journal box 175 and provided with a stuffing box 191 at one end thereof, said journal box adapted to receive, for free rotation therein, a stub shaft 192 having integrally formed on its aft end, or rigidly secured thereto, the bevel pinion 193 adapted to enmesh and drive the bevel gear 163 on the wheel shaft 5. The free end of the stub shaft 192 is connected to the shaft 195, which is suitably connected in any manner to the other engine of the vessel, as by means of the flanged coupling members 196 and 197 secured together as by the bolts 198, all in the same manner as above described. Or in other words, the shaft 195 may be the shaft of the other engine of the vessel, or it may correspond, for example, to the shaft 32 shown in Fig. 1 which in turn is connected to the engine shaft through any suitable speed reducing mechanism such as the train of gears shown in said figure.

The advantage of this modified form of the invention is seen to lie in the fact that the main bevelled gears 160 and 163 are maintained by the bevelled pinions 181 and 193 in back-to-back relation whereby the lateral thrust of one of said gears is taken up or neutralized by the lateral thrust of the other gear. Inasmuch as both paddle wheels 2 and 3 are rotating substantially all the time in the same direction, it will be seen that there is no wear upon the thrust washers 165, 166 and 167 and therefore the axial pressures exerted by both main drive gears does no damage inasmuch as there is no difference in speed of rotation of the wheel shafts 4 and 5, due to the fact that the engines are synchronously timed and the reduction gear ratio for the two wheels is the same. Therefore as above stated there is a neutralization of the lateral thrust of each of the gears 160 and 163, in the direction toward the other. There can be no outward lateral thrust of the bevel gears 160 and 163 not only because of the thrust washers 171 and 172, but also because of the enmeshed bevel pinions 181 and 193 so mounted that any tendency toward an outward lateral thrust of the main driving gear will have no effect other than to more tightly engage the meshing gears. The difference between this modification and the construction shown in Fig. 2 is that in this modification the bevel pinions are disposed outside of the bevel driving gears whereas in Fig. 2 they are disposed entirely within the said gears, and, due to the fact that in Fig. 2 one shaft passes coaxially through the other, there is a considerable saving of space in the gear construction which can be added to the width of paddle surface. However, in both constructions, it is to be noted that there is a strong and rigid drive obtained which is greatly to be desired in stern wheel boats because of the relatively high resistance offered by the water to the blades of the wheels which are located quite some distance from the wheel shaft, thus producing a strong leverage which in the types of construction heretofore proposed has often been sufficient to throw the bevel pinions and main bevel drive gears out of mesh, and in some instances cause considerable damage.

Figure 9:
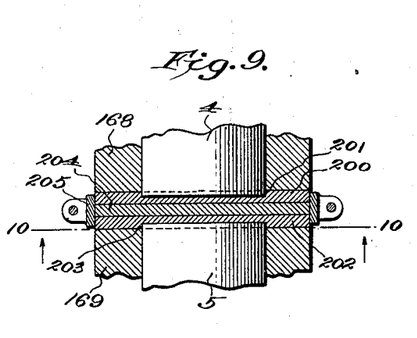
Fig. 9 is an enlarged detail view partly in section of a modified form of the thrust washers shown in Fig. 8.
Figure 10:
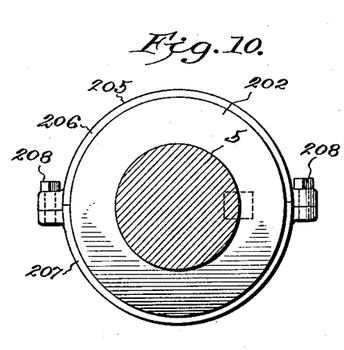
Fig. 10 is a sectional view taken on the line 10—10 of Fig. 9 and looking in the direction of the arrows.

Referring to Figs. 9 and 10 there is disclosed a slight modification of the construction of the thrust washers 165, 166 and 167 disclosed in Fig. 8. That is to say, in Fig. 9 is shown an enlarged detail view of the inner ends of the wheel shafts 4 and 5 and the extreme ends of the hubs 168 and 169 of the bevel gears mounted on said shaft. In the space between the said shafts there is placed a circular disk washer 200 formed with a central depression 201 on one side thereof adapted to seat the extreme end of the wheel shaft 4. Similarly the disk washer 202 is provided with a central countersunk portion 203 adapted to fit the extreme end portion of the wheel shaft 5, and between the washers 200 and 202 there is disposed the third disk washer 204. A split collar generally indicated at 205 holds all three washers from displacement. This split collar 205 is similar in all respects to the split collar 170 shown in Fig. 8, or in other words, is likewise made in two halves such as 206 and 207 secured together as by the bolt 208.

In Fig. 1 there was disclosed the method of driving the stern wheels of a boat from twin engines through the shafts 21 and 31 associated therewith. There are some boats however, which are provided with but a single engine and therefore with but a single drive shaft. Either of the driving gear mechanisms disclosed above can, however, be coupled with a single engine shaft or two engine shafts, although it will be well understood that a great deal more flexibility is had when using two engines than when using only one engine. In this case therefore, all one has to do to stop one of the twin engines completely whereupon the vessel at the lowest speed of the other engine can be maneuvered through one half of its wheel power because the other wheel will be inactive. At times it may be desired to rotate the two wheels of the boat in opposite directions thus forcing the water against the rudders of the boat which may be set in such position as to cause flank movement of the stern of the vessel. For such movement, the twin engine drive is particularly well adapted.

Figures 6, 7:
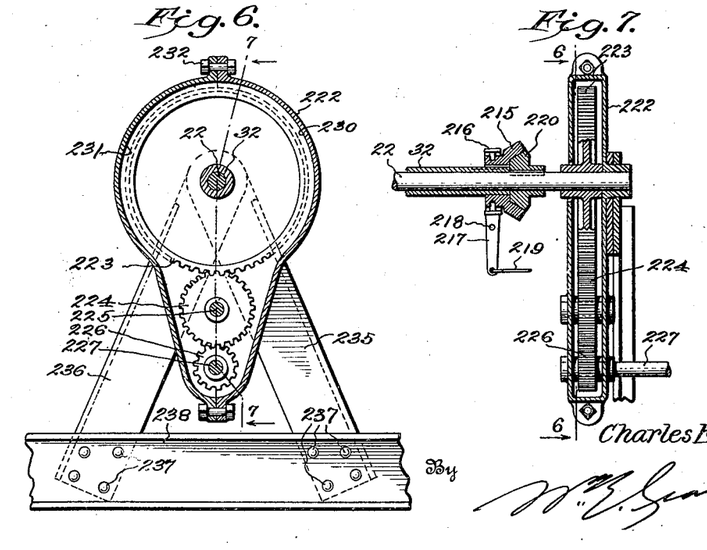
Fig. 6 is a sectional view similar to Fig. 5 of a modified form of gear reduction and power transmission when a single engine is used for motive power.
Fig. 7 is a sectional view taken on the line 7—7 of Fig. 6 and looking in the direction of the arrows.
Figures 11, 12, 13, 14:
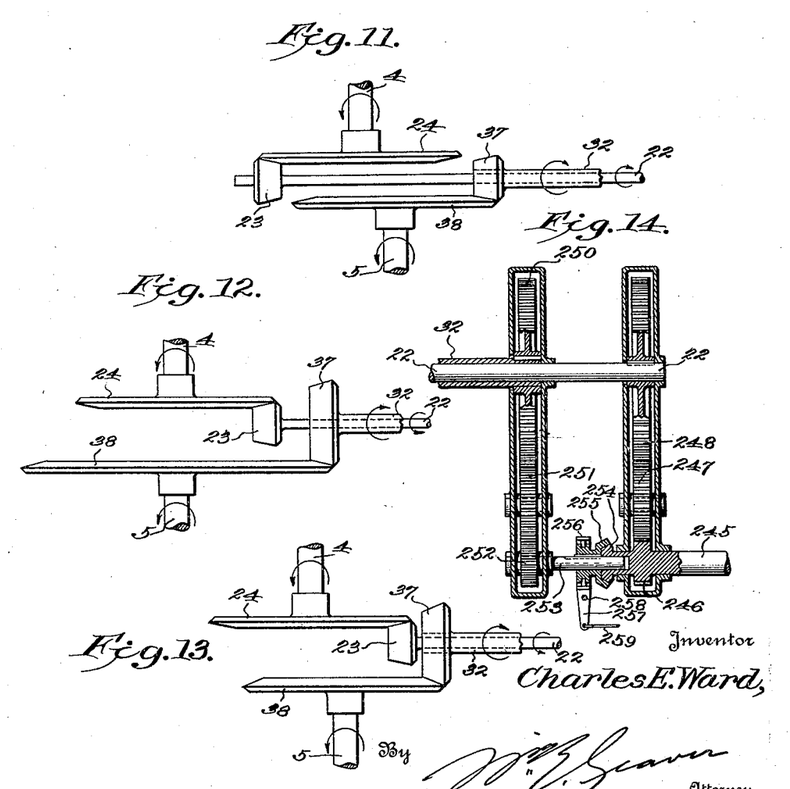
Figs. 11, 12 and 13 are diagrammatic views illustrating modified arrangements of parts within the scope of the invention.
Fig. 14 is a sectional view similar to Fig. 7 illustrating a double reduction gear arrangement and power transmission from a single engine shaft.

In Figs. 6, 7 and 14 are illustrated methods by which power may be transmitted to the two separate driving gears associated with the wheel shafts from a source of power through a single engine shaft. That is to say, in Fig. 7 there is shown the tubular shaft 32 and the solid shaft 22 passing therethrough all as disclosed in Figs. 1 and 2. Rigidly secured to the end of the tubular shaft 32 is the main driving pinion 250 meshing with the intermediate gear 251 which in turn meshes with the planetary pinion 252 mounted on one end of the stub shaft 253 the other end of which freely rotates within the member 254 of a clutch, said member being integral with or rigidly secured to the end of the main engine drive shaft 245. The other member 255 of the clutch is slidably mounted on the stub shaft 253 and adapted to rotate therewith, said member 255 being moved axially of the shaft by means of the yoke 256 disposed at one end of the lever 257 pivoted as at 258 and whose other end is connected as by the rod 259 to any source of power either manual or mechanical. It is to be understood that the speed reduction need not necessarily be made by a train of gears such as shown in Figs. 6, 7 and 14 since said reduction may be accomplished through the utilization of a chain and socket drive or any other suitable method of power transmission. Also, and with particular reference to Fig. 14, it is to be understood that instead of only one intermediate gear such as 151, there could be disposed two intermediate gears, both meshing with each other, one meshing with the gear 250 while the other meshed with the gear 252, with the result that the tubular shaft 32 would then be rotated in a direction opposite to the direction of rotation of the shaft 22. Therefore it will be seen that by the method illustrated in Fig. 14, where the clutch is disposed on the engine shaft and between two separate gear reductions, the direction of rotation of the two wheel shafts may be made to be the same or different as desired all within the scope of this invention.

In Figs. 11, 12 and 13 are disclosed diagrams showing slight modifications of the constructions heretofore disclosed. That is to say, in each of these diagrams there is incorporated the solid shaft 22 adapted to rotate within the outer tubular shaft 32, and a bevel pinion 23 disposed on the end of the solid shaft 22 as well as a bevel pinion 37 disposed on the end of the tubular shaft 32. With particular reference to Fig. 11 it will be observed that the two shafts 22 and 32 are rotated in the same direction and the bevel pinions 23 and 37 are disposed in such relation with their enmeshed main bevelled driving gears 23 and 38 mounted upon the wheel shafts 4 and 5, that said wheel shafts will be rotated in the same direction. It is, however, to be observed that the wheel shafts 4 and 5 are in misalignment as may become necessary in some types of boats.

In Fig. 13, with the same misalignment of the wheel shafts 4 and 5, it will be observed that the said shafts are rotated in the same direction. But in said figure it has become necessary to change the location of the bevel pinion 23, meshing with the bevel drive gear 24, to a point diametrically opposed to that shown in Fig. 11. In such a case it will therefore be seen that it will be necessary to rotate the solid shaft 22 in a direction contrary to the direction of rotation of the tubular shaft 32 all as indicated by the arrows.

In Fig. 12 we have the same general conditions to meet as appeared in the problem represented by Fig. 13, but it is possible in Fig. 12 to have the wheel shafts 4 and 5 in exact alignment. In other words, the difference between 12 and 13 lies only in the position of the wheel shafts 4 and 5, the other disposition of parts being substantially the same.

From the above disclosures it will therefore be seen that the driven shafts 22 and 32 have means associated therewith for supporting the inboard ends thereof as well as the stern ends of the drive shafts 21 and 31, said means comprising the gear casings 100 and 120 as well as the structural members 110 and 131. Also it will be observed that the coaxial or concentrically disposed driven shafts are not only disposed in a plane which is substantially parallel to the plane of the power shafts 21 and 31, but said driven shafts are disposed in the same plane with one of the drive shafts, which plane is parallel to the other drive shaft. It will also be observed that the power or drive shafts 21 and 31 are both disposed below the deck whereas the driven shafts are disposed above the deck. This construction is particularly advantageous in boats of this type, because said boats are best suited for shallow water navigation, wherein it is desirable to not have the propelling means extend below the bottom of the vessel which is of very slight draft. Therefore it has been found necessary to dispose the engines in the lowest possible part of the vessel because of their weight, and for other reasons including the gravity feed of the fuel for said engines. By so positioning these engines, which may be of the Diesel or other type, the shafts thereof can be disposed below the deck, which is a very desirable and advantageous feature as they will not be subject to damage, nor be in the way of freight, etc., thus giving more deck space. Therefore, in stern wheel boats where the axle of the propelling wheel is above the deck, it is necessary to have the driving shafts 22 and 32 disposed above said desk, which in turn necessitates the transmitting of the power from the engine shaft through the deck to said shafts 22 and 32.

It will also be observed from the foregoing and with particular reference to Fig. 8 that the drive gears for the wheels are maintained in their position by their disposition between the bevel pinions driving the same. Due to the fact that the bevel pinions in either construction are rigidly mounted to the framework of the vessel, it will be seen therefore that the lateral thrust placed upon the drive gears is absorbed by the framework of the vessel, and particularly in Fig. 8 it is shown that the lateral thrust in one direction of one of the drive gears is neutralized by the other drive gear.

It is obvious that those skilled in the art may vary the details of construction as well as the arrangements of parts without departing from the spirit of the invention, and therefore it is not desired to be limited to the foregoing except as may be demanded by the claims.

What is claimed is:—

1. In a reduction gear drive for stern wheel boats the combination of duplicate power shafts; twin driven shafts and means associated therewith for supporting the inboard ends thereof as well as for supporting the stern end of said power shafts; single means to support the outboard ends of said driven shafts; speed reducing connections between said shafts; propelling means; drive connections between said propelling means and said driven shafts; and means to keep said last named connections in positive engagement.

2. In a reduction gear drive for stern wheel boats the combination of duplicate power shafts; twin driven shafts and means associated therewith for supporting the inboard ends thereof as well as for supporting the stern end of said power shafts; means comprising a housing to support the stern end of said driven shafts; speed reducing connections between each drive shaft and a driven shaft; propelling means; drive connections between said propelling means and said driven shafts; and means to keep said last named connections in positive engagement.

3. In a reduction gear drive for stern wheel boats the combination of duplicate power shafts; twin driven shafts disposed out of the plane of and adapted to support the stern end of said power shafts; means to support said driven shafts; speed reducing connections between said shafts; propelling means; drive connections between said propelling means and said driven shafts; and means to keep said last named connections in positive engagement.

4. In a reduction gear drive for stern wheel boats the combination of duplicate power shafts; twin driven shafts and means associated therewith for supporting the inboard ends thereof as well as for supporting the stern end of said power shafts; means to support the outboard ends of said driven shafts; speed reducing connections between said shafts carried by said first named means; propelling means; drive connections between said propelling means and said driven shafts; and means to keep said last named connections in positive engagement.

5. In a reduction gear drive for stern wheel boats the combination of duplicate parallel power shafts; twin coaxial driven shafts and means associated therewith for supporting the inboard ends thereof as well as for supporting the stern end of said power shafts; single means to support the outboard ends of said driven shafts; speed reducing connections between said shafts carried by said first named means; propelling means; drive connections between said propelling means and said driven shafts; and means to keep said last named connections in positive engagement.

6. In a reduction gear drive for stern wheel boats the combination of duplicate power shafts; twin driven shafts and means associated therewith for supporting the inboard ends thereof as well as for supporting the stern end of said power shafts; single means to support the outboard ends of said driven shafts; speed reducing connections between said shafts; propelling means disposed on either side of said second named means; drive connections between said propelling means and said driven shafts; and means to keep said last named connections in positive engagement.

7. In a reduction gear drive for stern wheel boats the combination of duplicate power shafts; twin driven shafts and means associated therewith for supporting the stern end of said power shafts, one of said driven shafts disposed within the other; means to support said driven shafts; speed reducing connections between said shafts; propelling means; drive connections between said propelling means and said driven shafts; and means to keep said last named connections in positive engagement.

8. In a reduction gear drive for stern wheel boats the combination of duplicate power shafts; twin driven shafts and means associated therewith for supporting the stern end of said power shafts; means to support said driven shafts; speed reducing connections between said shafts; propelling means; angularly disposed means comprising a pair of gears disposed between a pair of coaxial gears to drive said propelling means from said driven shafts; and means to keep said last named means in positive engagement.

9. In a reduction gear drive for stern wheel boats the combination of duplicate power shafts; twin driven shafts and means associated therewith for supporting the stern end of said power shafts; speed reducing connections between said shafts; propelling means; drive connections between said propelling means and said driven shafts; and single means including a housing rigid with the framework of the boat to support said driven shafts as well as to keep said last named connections in positive engagement.

10. In a reduction gear drive for stern wheel boats the combination of duplicate power shafts; twin driven shafts and means associated therewith for supporting the stern end of said power shafts; means to support said driven shafts; speed reducing connections between said shafts; propelling means; drive connections between said propelling means and said driven shafts; and means cooperating with said second named means and including thrust washers and a housing rigid with the framework of the boat to keep said last named connections in positive engagement.

11. In a reduction gear drive for stern wheel boats the combination of duplicate power shafts; twin power shafts and means associated therewith for supporting the stern end of said driven shafts; means to support said driven shafts; speed reducing connections between said shafts; twin propelling means; drive connections between said propelling means and said driven shafts; and means intermediate the propelling means and rigid with the framework of the boat to absorb the lateral thrust of the propelling means.

12. In a reduction gear drive for stern wheel boats the combination of duplicate power shafts; twin power shafts and means associated therewith for supporting the stern end of said driven shafts; means to support said driven shafts; speed reducing connections between said shafts; twin propelling means; drive connections between said propelling means and said driven shafts; and means disposed between said propelling means and rigid with the framework of the boat to keep said last named connections in positive engagement as well as to absorb the lateral thrust of said propelling means.

13. In a reduction gear drive for stern wheel boats the combination of duplicate power shafts; twin driven shafts and means associated therewith for supporting said power shafts; means to support said driven shafts; speed reducing connections between said shafts; propelling means; drive connections between said propelling means and said driven shafts; and means disposed between said propelling means to neutralize all lateral thrust thereof.

14. Means for propelling a boat of the stern wheel type including a divided propeller shaft and wheel; a thrust absorbing drive connection disposed between the divided parts to rotate said wheels, and power transmission from an engine shaft to said drive connection.

15. Means for propelling a boat of the stern wheel type including a divided coaxial propeller shaft having a wheel on each portion; thrust absorbing drive connections disposed between the ends of said divided portions for rotating said wheels; and power connections for variably rotating said wheels.

16. Means for propelling a boat of the stern wheel type including a divided propeller shaft having a wheel on each portion; a thrust absorbing drive connection disposed between the ends of said divided portions for rotating said wheels; and power connections adapted to control the directional rotation of said wheels.

17. In a gear drive of the character described the combination of a power shaft; a driven shaft; means to transmit power from said power shaft to said driven shaft; propelling means and a shaft therefor; drive connections between said propeller shaft and said driven shaft; and a housing for said drive connections constituting means for preventing disengagement thereof.

In testimony whereof I affix my signature.

CHARLES E. WARD.